W. A. BESSERDICH.
TRANSMISSION MECHANISM.
APPLICATION FILED JUNE 14, 1913.
1,136,644.
Patented Apr. 20, 1915.
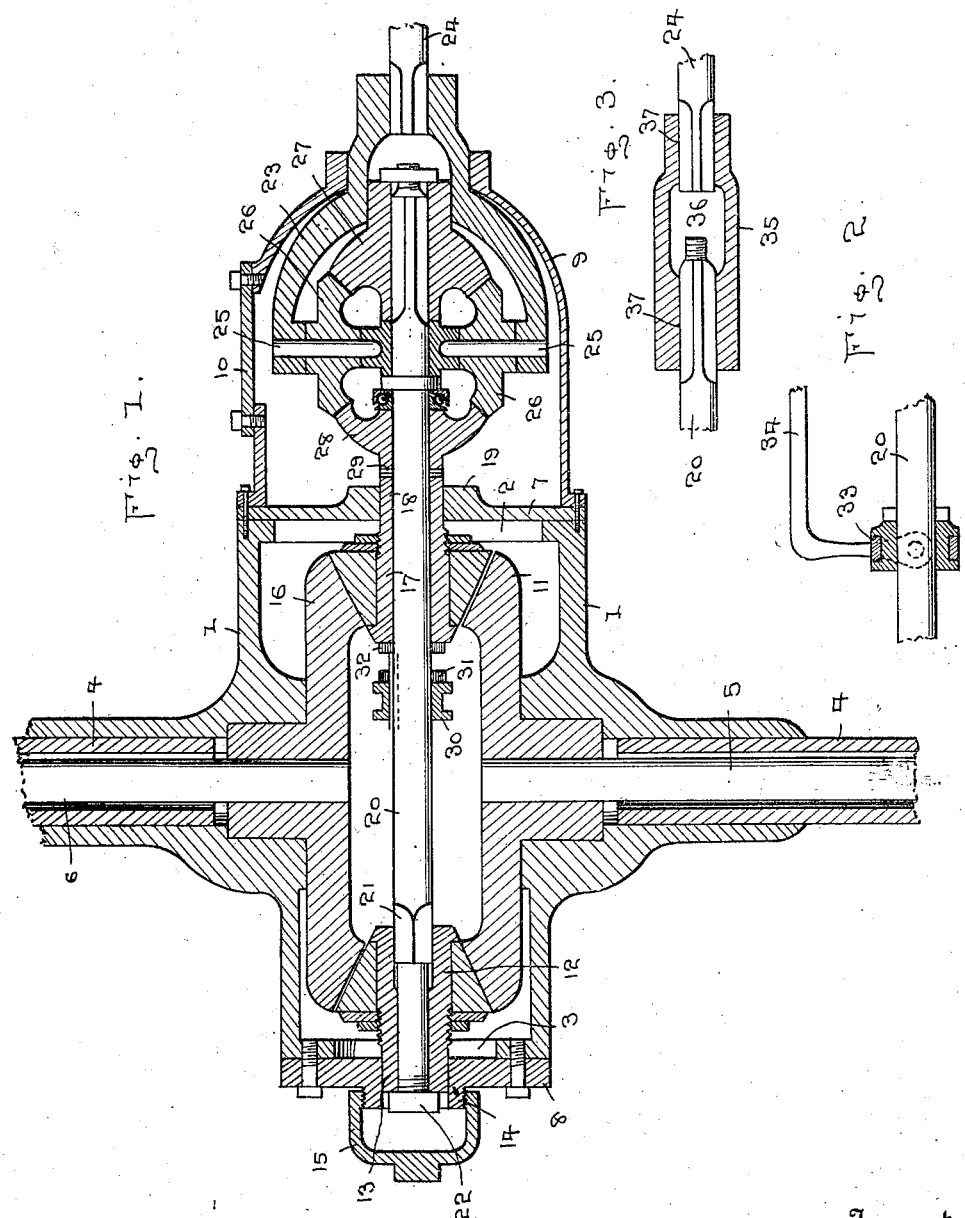
Witnesses
Inventor
W. A. Besserdich
By
Attorneys

UNITED STATES PATENT OFFICE.

WILLIAM A. BESSERDICH, OF CLINTONVILLE, WISCONSIN, ASSIGNOR OF ONE-HALF TO BERNHARD A. MOSLING, OF CLINTONVILLE, WISCONSIN.

TRANSMISSION MECHANISM.

1,136,644.  Specification of Letters Patent.  Patented Apr. 20, 1915.

Application filed June 14, 1913. Serial No. 773,696.

*To all whom it may concern:*

Be it known that I, WILLIAM A. BESSERDICH, a citizen of the United States, residing at Clintonville, in the county of Waupaca and State of Wisconsin, have invented certain new and useful Improvements in Transmission Mechanism; and I do hereby declare the following to be a full, clear, and exact description of the invention, such as will enable others skilled in the art to which it appertains to make and use the same.

This invention relates to a transmission mechanism especially adapted for driving axles of a motor vehicle, but is not necessarily limited to such use.

An object of the invention is the provision of a mechanism including a differential gearing disposed laterally of the parts of the driving axle in a motor vehicle, and having independently operable connections with the parts of said axle.

Another object is to provide means for effecting a positive operative connection between the drive member and the parts of the driving axle of the motor vehicle, whereby spinning of either wheel of the axle is prevented.

Another object is to provide an emergency coupling device adapted to replace the differential gearing when the latter, for any reason, becomes inoperative.

In the accompanying drawings, Figure 1 represents a horizontal section through the transmission mechanism, and showing the fragments of a drive shaft and axle, Fig. 2 represents a fragmentary sectional view of a clutch therefor, and, Fig. 3 represents a fragmentary sectional view through the emergency coupling device adapted to replace the differential gearing in case of breakage of the latter.

Referring to the drawings, the numeral 1 indicates a housing for the mechanism having openings 2 and 3 in the front and rear ends thereof, respectively. The sides of the housing 1 are adapted to receive sleeves or housings 4 for the axle parts 5 and 6 of a motor vehicle. The opening 2 of the housing is normally closed by a removable bearing block 7 and the opening 3 in the rear end thereof is normally closed by a bearing block 8. A differential gearing housing 9 is secured to the front end of the housing 1 and is provided with a removable cover 10 for permitting access to the differential gearing to be hereinafter described.

The part 5 of the axle carries a friction wheel 11 disposed within the housing 1 and meshing or contacting with a friction cone 12. The hub 13 of the cone 12 is rotatably mounted within an apertured boss 14 of the block 8 having exterior screw threads, over which is threaded a dust cap 15, for excluding dust from the bearing. The axle 6 is provided with a friction wheel 16 of the same diameter as the wheel 11 contacting or meshing with a second cone 17, the hub 18 of which is rotatably received within the boss 19 of the bearing block 7.

The cone 12 is fixed on the squared end of an intermediate shaft 20 by a nut 22 and the cone 17 is rotatably mounted adjacent the opposite end thereof. The shaft 20 is disposed at such an angle relative to the line of the axle parts 5 and 6 that the cone 12 is permanently held in contact with the wheel 11 and in spaced relation to the wheel 16 while the cone 17 is permanently held in contact with the wheel 16 and in spaced relation to the wheel 11.

A yoke 23 is rotatably mounted through the forward open end of the differential gearing housing 9 and is affixed to the rear squared end of the engine or drive shaft 24. The yoke 23 carries a pair of inwardly extending pins 25 over which are rotatably mounted bevel gears 26. A bevel gear 27 is nonrotatably secured to the forward end of the intermediate shaft 20 and meshes with the bevel gears 26. The opposite or rear side of the bevel gears 26 are meshed with a bevel gear 28, rotatably mounted on the intermediate shaft 20 and permanently keyed at 29 to the hub of the friction cone 17, whereby both rotate in unison.

A slidable clutch member 30 is keyed upon the shaft 20 intermediate the cones 12 and 17, and adjacent the latter. The clutch member 30 carries a set of teeth 31 adapted to be locked with the set of teeth 32 of the friction cone 17 when said member is moved forwardly by the rotatable collar 33 and actuating lever 34, which latter may be extended forwardly of the vehicle to a point convenient to the operator.

When the teeth of the clutch member 30 are disengaged from the teeth of the friction cone 17, and the parts 5 and 6 of the axle of the vehicle are permitted to rotate at the same speed, the bevel gears 27 and 28 are driven in unison, as in the ordinary differential gearing, by the intermediate gears 26, yoke 23 and drive shaft 24. The bevel gear 27 being keyed to the intermediate shaft 20, consequently positively drives the friction wheel 11 of the part 5 through the friction cone 12, which is keyed to the rear end of the shaft. Similar rotation is transmitted to the friction wheel 16 of the part 6 of the axle through the bevel gear 28 and cone 17 keyed to the latter.

It will be apparent that the parts 23, 25, 26, 27 and 28 of the differential gearing will accommodate any variance in the respective speeds of the cones 12 and 17, due to the difference in the length of the course taken by the wheels of the parts of the axle, as when turning.

To couple the forward friction cone 17 to the intermediate shaft 20, and thus insure a positive drive through the differential gearing to both parts of the axle, the clutch member 30 is moved forward by means of the lever 34 until its teeth are locked with the teeth 32 of the cone 17.

In case of an emergency, as when the differential gearing is broken, the coupling member 35 may be employed. This member consists substantially of a sleeve having an enlarged central opening 36 and squared openings 37 communicating therewith and adapted to receive the front end of the intermediate shaft 20 and the rear end of the drive shaft 24. It is obvious that this emergency device 26 will not accomplish the functions of the differential gearing, yet it is clearly apparent that said device will be extremely useful in case of breakage upon the road where a mechanic is not at hand to replace the broken or inoperative parts or to render other expert service as would be required.

What I claim is:

A transmission gearing comprising; a housing, axles mounted in said housing, a friction wheel mounted on the inner end of each of said axles to actuate the same, a drive shaft, an intermediate shaft mounted in said housing and playing between said friction wheels, a differential gearing connecting said intermediate shaft to said drive shaft to actuate the said intermediate shaft, a friction cone rigidly mounted on one end of said intermediate shaft and frictionally engaging one of said friction wheels to actuate the same, a second friction cone rotatably and loosely mounted on said intermediate shaft and frictionally engaging the second of said friction wheels to actuate the same, said last mentioned friction cone being connected at its outer end to said differential gearing to be actuated thereby, and having teeth upon the inner end thereof, and a clutch device keyed to said intermediate shaft between said friction cones and said friction wheels and mounted for longitudinally sliding movement along said intermediate shaft, said clutch device having teeth upon its outer end adapted to engage the teeth upon the inner end of said last mentioned friction cone to thereby operate said axles from a differential to a direct drive.

In testimony whereof I have signed my name to this specification in the presence of two subscribing witnesses.

WILLIAM A. BESSERDICH.

Witnesses:
CHAS. J. LAUX,
LEVI C. LARSON.